US009732678B2

(12) United States Patent
McCabe

(10) Patent No.: US 9,732,678 B2
(45) Date of Patent: Aug. 15, 2017

(54) SPEED CARD-CONTROLLED OVERRIDE FUEL PUMP ASSIST

(71) Applicant: The Boeing Company, Chicago, IL (US)

(72) Inventor: William H. McCabe, McLeansville, NC (US)

(73) Assignee: The Boeing Company, Chicago, IL (US)

(*) Notice: Subject to any disclaimer, the term of this patent is extended or adjusted under 35 U.S.C. 154(b) by 267 days.

(21) Appl. No.: 14/602,412

(22) Filed: Jan. 22, 2015

(65) Prior Publication Data
US 2016/0169121 A1 Jun. 16, 2016

Related U.S. Application Data

(62) Division of application No. 13/229,751, filed on Sep. 11, 2011, now Pat. No. 8,950,186.

(51) Int. Cl.
F02C 9/30 (2006.01)
F02C 7/236 (2006.01)
(Continued)

(52) U.S. Cl.
CPC ............... F02C 9/30 (2013.01); B64D 37/28 (2013.01); F02C 7/222 (2013.01); F02C 7/236 (2013.01);
(Continued)

(58) Field of Classification Search
CPC .. F02C 7/236; F02C 7/222; F02C 9/28; F02C 9/30; F02C 9/46; B64D 37/26; B64D 37/28; F05D 2270/304
See application file for complete search history.

(56) References Cited

U.S. PATENT DOCUMENTS 3,275,061 A 9/1966 Williams et al.
4,038,817 A * 8/1977 Snow ................ B64D 37/26
137/870
(Continued)

FOREIGN PATENT DOCUMENTS

EP 1731422 12/2006

OTHER PUBLICATIONS

Extended European Search Report; European Application No. 13151085.1 (Jul. 2, 2014).
(Continued)

Primary Examiner — Andrew Nguyen
(74) Attorney, Agent, or Firm — Thompson Hine LLP

(57) ABSTRACT

A system and method for supplementing fuel feed pressure and flow within an aircraft fuel system. The fuel system includes boost and override fuel pumps delivering fuel from the tanks to a fuel manifold, and a jettison fuel pump. The method includes the steps of: (a) sensing whether the aircraft engine is operating near maximum power; (b) upon sensing the condition, operating the jettison fuel pump in fluid interconnection with the override fuel pump to deliver fuel to the fuel manifold; and (c) upon sensing the cessation of the condition, deactivating the jettison fuel pump. The system includes a monitoring circuit signaling when the aircraft engine speed is greater than a predetermined threshold, and a fuel system control circuit operating a jettison fuel pump enable circuit portion in response to the signal while omitting other jettisoning operations. The jettison fuel pump consequently functions as an override fuel pump assist.

19 Claims, 17 Drawing Sheets

(51) Int. Cl.
  *F02C 9/28*   (2006.01)
  *F02C 7/22*   (2006.01)
  *B64D 37/28*  (2006.01)

(52) U.S. Cl.
  CPC ............ *F02C 9/28* (2013.01); *F05D 2260/80* (2013.01); *F05D 2270/304* (2013.01)

(56) References Cited

U.S. PATENT DOCUMENTS

| | | |
|---|---|---|
| 7,591,277 B2 | 9/2009 | Johnson et al. |
| 7,665,479 B2 | 2/2010 | Cutler et al. |
| 7,857,260 B2 * | 12/2010 | Morgia .................. B64D 37/26  244/135 C |
| 2007/0084511 A1 | 4/2007 | Johnson et al. |

OTHER PUBLICATIONS

Nguyen, Andrew H.; Notice of Allowance; U.S. Appl. No. 13/229,751; (Oct. 8, 2014).

* cited by examiner

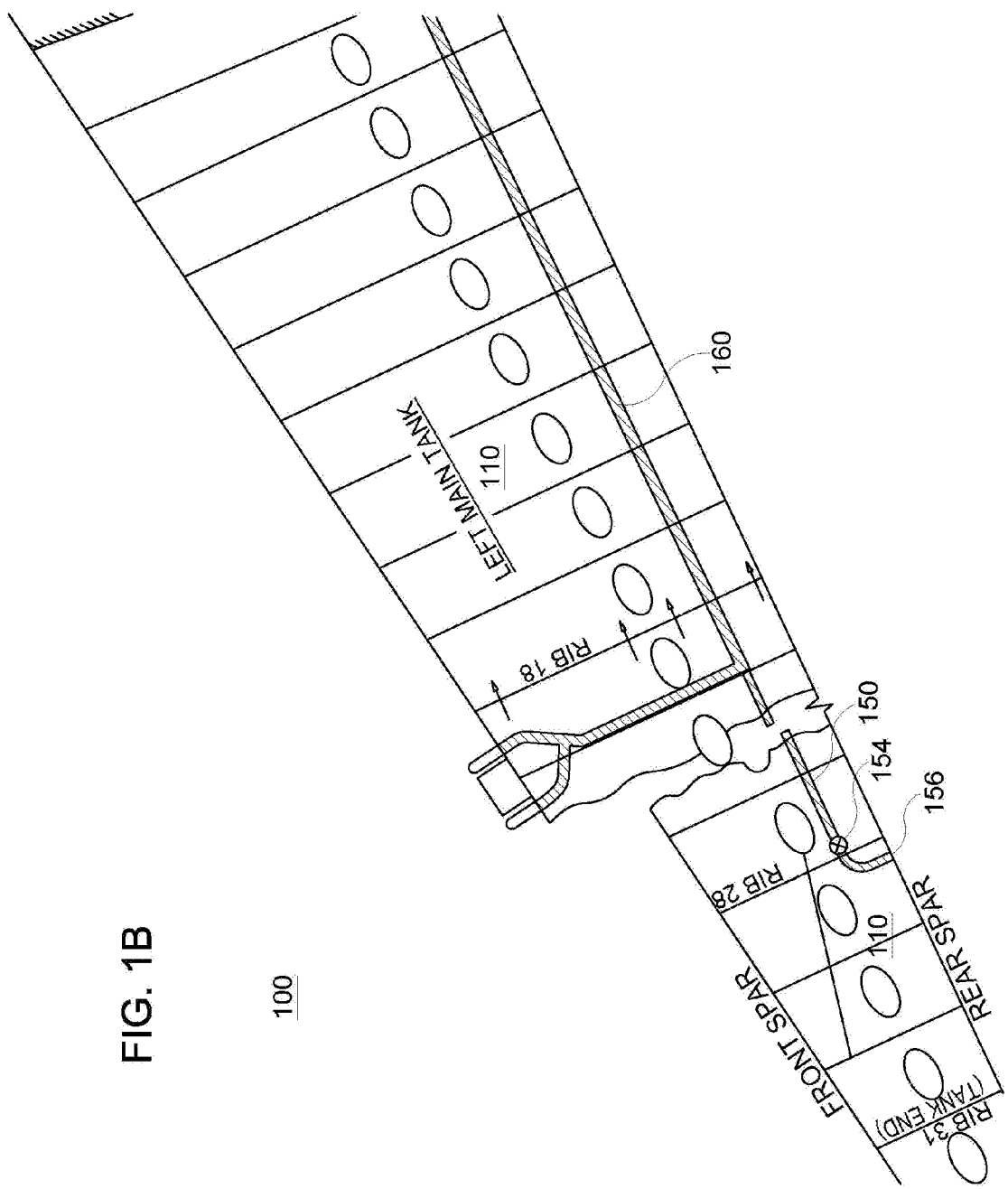

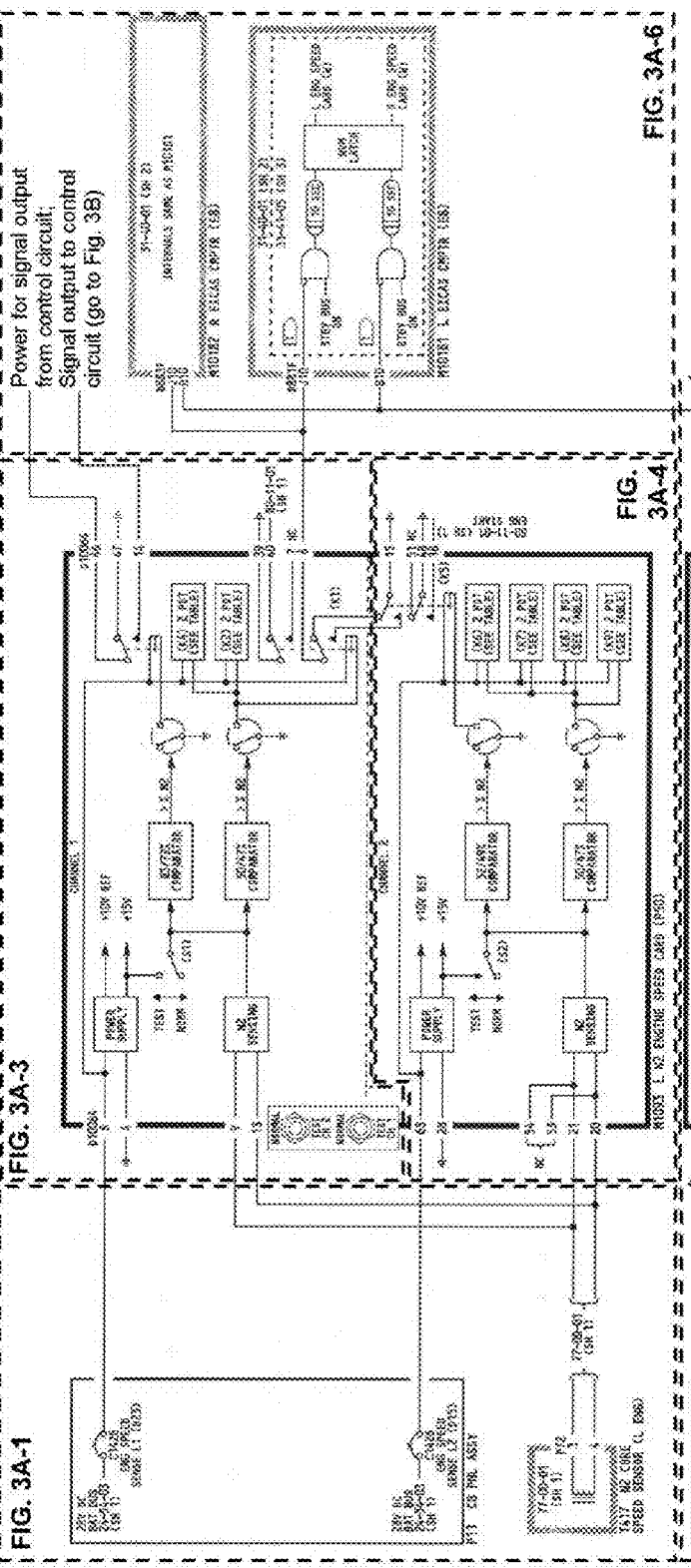

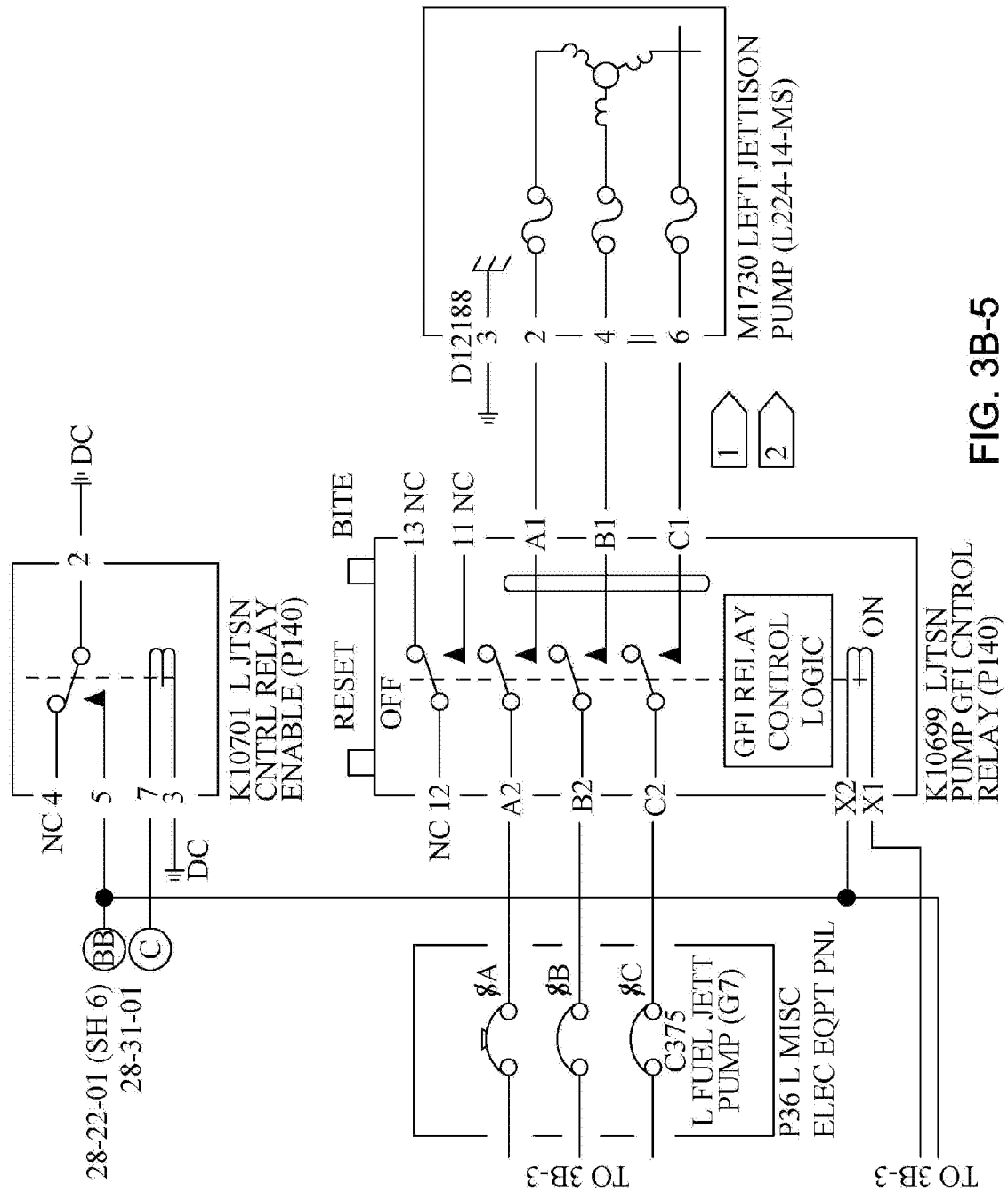

SPEED CARD-CONTROLLED OVERRIDE FUEL PUMP ASSIST

This application is a divisional application of prior U.S. patent application Ser. No. 13/229,751, filed Sep. 11, 2011, the entirety of which is incorporated by reference.

FIELD

The present disclosure is directed to systems and methods for the distribution of fuel within a jet aircraft and, in particular, to systems and methods for supplementing fuel feed pressure and flow within a jet aircraft having multiple fuel tanks.

BACKGROUND

Large, multiple engine jet aircraft typically have a fuel system which includes multiple fuel tanks in order to provide long-haul capability while maintaining a proper distribution of weight. In the case of a Boeing 767-300, the aircraft has a primary fuel tank or "wing tank" holding up to 18,500 kgs of fuel in each of the aircraft's wings, and a single auxiliary fuel tank or "center wing tank" holding up to 36,500 kgs of fuel in the aircraft's center wing box. The fuel tanks are fluidly connected to the aircraft's twin engines by a fuel manifold, with the wing tanks and the center wing tank being fluidly connected to the fuel manifold through a cross-feed manifold portion running through the center wing box. This cross-feed manifold portion is divided into two halves by at least one cross-feed valve, with the center wing tank being fluidly connected to both halves of the cross-feed manifold portion in order to create two operationally separate, yet selectively interconnectable, multiple tank subsystems for distributing fuel to the engines.

Fuel is pumped from the primary and auxiliary fuel tanks into the fuel manifold by a plurality of fuel pumps. In the case of a Boeing 767-300, each wing tank includes two low pressure boost fuel pumps, both of which are fluidly connected the same half of the cross-feed manifold portion for sake of redundancy, while the center wing tank includes two high pressure fuel pumps, each of which is fluidly connected to a different half of the cross-feed manifold portion in order to permit independent auxiliary fueling of the aircraft engines. In most aircraft fuel systems, and under ordinary conditions, the auxiliary tank is operated in an override mode, meaning that the low pressure boost fuel pumps in a primary tank remain active regardless of whether fuel is to be drawn from the primary tank or the auxiliary tank. When fuel is to be drawn from the auxiliary tank, a high pressure fuel pump or "override fuel pump" is activated to deliver fuel to the fuel manifold at a greater pressure than the low pressure boost fuel pumps can generate, overriding the flow of fuel from the boost fuel pumps into the fuel manifold and, in effect, de-selecting the primary tank. On the other hand, when fuel is to be drawn from the primary tank, then the override fuel pump is deactivated, and the flow of fuel from the boost fuel pumps into the fuel manifold resumes. In short, in an override-based aircraft fuel system, the system will include both low pressure boost fuel pumps and high pressure override fuel pumps, with the boost fuel pumps remaining active in order to prevent an interruption in fuel flow which could result in an engine flameout, and fuel manifold pressure controlling whether fuel will be drawn from a particular fuel tank.

In some aircraft, factors such as the specific performance capabilities of the installed boost and override fuel pumps, the backpressure profile of the fuel manifold, and the suction pressure generated by an aircraft engine's own fuel pumps can diminish the fuel pressure proximate the boost fuel pumps and cause an "incomplete override" of one or more of the pumps, allowing fuel to be unintentionally drawn from a primary fuel tank, e.g., a wing tank, rather than an auxiliary fuel tank, e.g., a center wing tank. Such a situation may occur, for example, if an engine is operating near maximum power during the aircraft's initial climb and one of the installed boost fuel pumps is capable of pumping at greater-than-average pressures due to pump-to-pump manufacturing variations. Because the amount of fuel drawn from various fuel tanks will vary in an incomplete override scenario depending upon the individual performance capabilities of the fuel pumps, fuel may be drawn unevenly from the aircraft's fuel tanks, adversely affecting the aircraft's distribution of weight, in addition to contravening flight practices which require that auxiliary fuel supplies be essentially exhausted before switching over to primary fuel supplies. This unplanned and, likely, uneven fuel draw may require frequent adjustments to aircraft trim and repeated rebalancing of the aircraft's fuel load, increasing both pilot workload and opportunities for the risks associated with in-flight fuel transfers to become manifest.

The applicant has developed a system and method for supplementing fuel feed pressure and flow without requiring the replacement of existing fuel pumps in existing aircraft, the replacement of existing fuel pump designs in existing aircraft designs, and the like. The disclosed system and method enable the automatic control of a multi-tank, multi-pump, override-based aircraft fuel system using pre-existing fuel pumps or fuel pump designs, in combination with novel modifications to the aircraft's engine monitoring circuitry and fuel system control circuitry, in order to assist the override fuel pump. The system and method thus mitigate a risk of incomplete override with substantially reduced engineering cost and, potentially, substantially reduced maintenance costs and out-of-service delays.

SUMMARY

In one form, a method for supplementing fuel feed pressure and flow within an aircraft fuel system fueling an aircraft engine. The aircraft fuel system includes a primary fuel tank, a first boost fuel pump delivering fuel from the primary tank to a fuel manifold, an auxiliary fuel tank, an override fuel pump delivering fuel from the auxiliary tank to the fuel manifold, and a jettison fuel pump operable to draw fuel from the auxiliary fuel tank. The method includes the steps of: (a) sensing whether the aircraft engine is operating near maximum power; (b) upon sensing that the aircraft engine is operating near maximum power, operating the jettison fuel pump in fluid interconnection with the override fuel pump to deliver fuel to the fuel manifold; and (c) upon sensing that the aircraft engine has ceased to operate near maximum power, deactivating the jettison fuel pump. The jettison fuel pump may be a component of a fully-installed jettison system, with the operating step omitting any jettisoning operation of a jettisoning valve, or may be a component of a partially-installed jettison system, with the jettison fuel pump functioning only as an override fuel pump assist.

In another form, an override-based aircraft fuel system including a fuel manifold, a primary fuel tank having a first boost fuel pump fluidly connected to the fuel manifold, and an auxiliary fuel tank having both an override fuel pump, fluidly connected to the fuel manifold, and a jettison fuel pump, fluidly connectable to the fuel manifold. The fuel system further includes an engine monitoring circuit including (a) an aircraft engine speed sensor operatively connected to a comparator and (b) a control relay selectively providing a signal output, with the comparator and control relay providing the signal output when the aircraft engine speed sensor detects an aircraft engine speed greater than a predetermined threshold. The signal output is communicated to a fuel system control circuit including a first operating relay operatively connected to a jettison fuel pump enable circuit portion, where the signal output operates the first operating relay and the jettison fuel pump enable circuit portion to operatively control the jettison fuel pump and deliver fuel to the fuel manifold.

BRIEF DESCRIPTION OF THE DRAWINGS

FIG. 1B is a second partial schematic diagram of an exemplary aircraft fuel system, joining to FIG. 1A along the former figure's right edge.

" FIG. 3A is a smaller scale view showing the whole formed by the partial views of FIGS. 3A-1 to 3A-6.

FIGS. 3B and 3B-1 to 3B-6 are a partial schematic diagram of an exemplary aircraft fuel system control circuit including jettison system valve control circuitry. FIG. 3B is a smaller scale view showing the whole formed by the partial views of FIGS. 3B-1 to 3B-6.

DETAILED DESCRIPTION

Figure 1A:
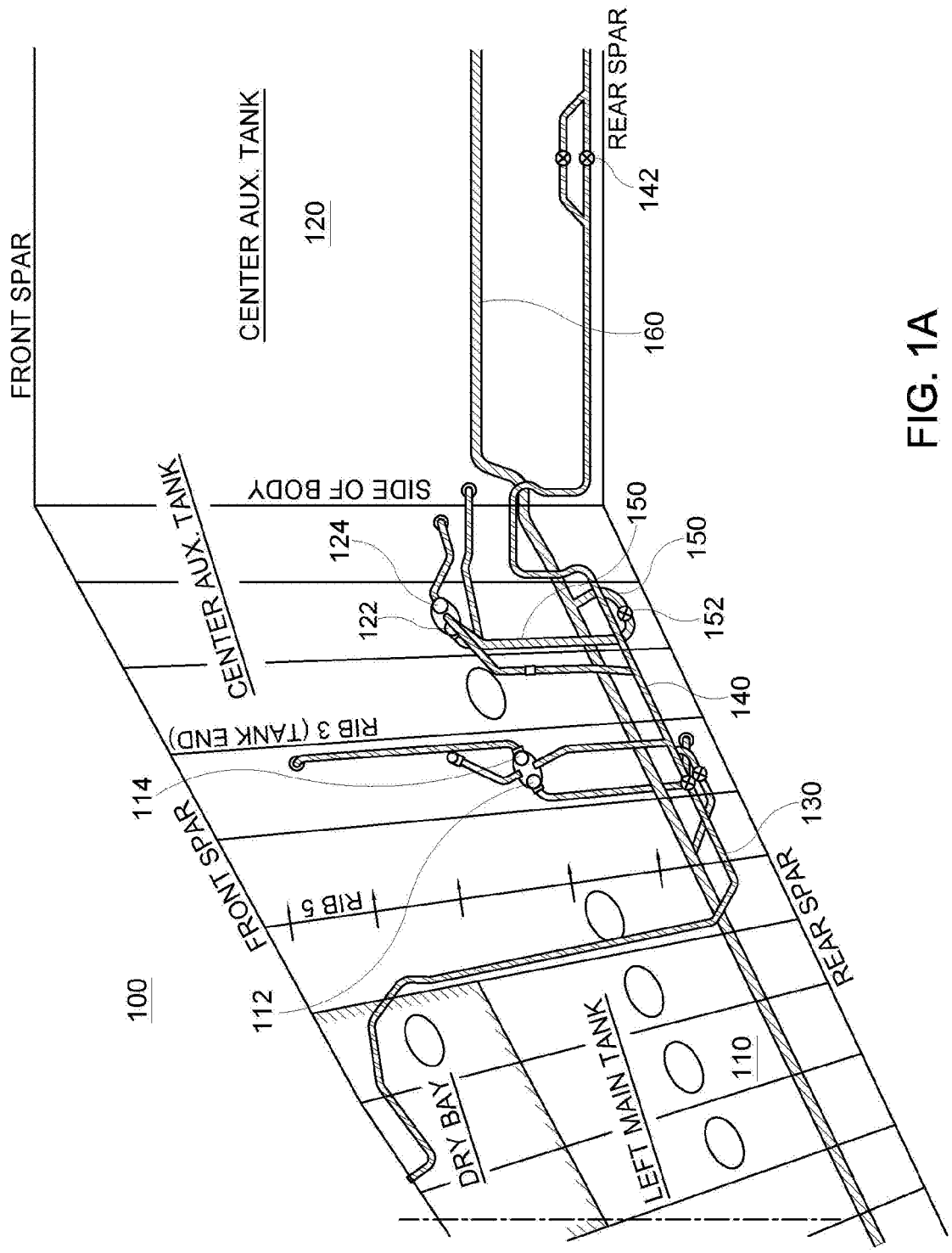
FIG. 1A is a first partial schematic diagram of an exemplary aircraft fuel system, joining to FIG. 1B along the former figure's left edge.

With initial reference to FIG. 1A, a first aspect of the disclosed system and method comprises an improvement to an existing aircraft fuel system 100. The aircraft fuel system 100 includes a first main fuel tank or primary tank 110, which may be disposed within a wing as a so-called "wing tank," and a second main fuel tank or auxiliary tank 120, which may be at least partially disposed within the aircraft's central fuselage as a so-called "center wing tank" or the like. The primary tank 110 includes at least a first boost fuel pump 112, and in typical variations may include a second boost fuel pump 114. The auxiliary tank 120 includes an override fuel pump 122 and, in a first embodiment, also includes a jettison fuel pump 124. A fuel manifold 130 interconnects the primary and auxiliary tanks 110, 120 with an aircraft engine (not shown), with the first and second boost fuel pumps 112, 114 being fluidly connected to the fuel manifold 130 to deliver primary fuel to the aircraft engine, and the override fuel pump 122 being fluidly connected through a check valve to the fuel manifold 130 to deliver auxiliary fuel to the aircraft engine. In multiple engine aircraft, the boost fuel pump 112 (and 114, if present) and the override fuel pump 122 may be connected to a cross-feed manifold portion 140, with the cross-feed manifold portion 140 including at least one cross-feed valve 142 to divide the fuel system 100 into interconnectable subsystems, such as left and right subsystems. As indicated in the brief description of the drawings, the right subsystem of the fuel system 100 shown in FIG. 1 has been omitted, but it will be understood that the exemplary system being discussed herein is essentially bilaterally symmetric, with duplicate components and connections being provided for the two halves of the exemplary system.

Jettison fuel pump 124 may be a component of a pre-existing, fully-installed jettison system 150, shown in FIGS. 1A and 1B, which typically includes a jettison transfer valve 152 fluidly connected to the jettison fuel pump 124, a jettison nozzle valve 154 fluidly connected to the jettison transfer valve 152, and a jettison nozzle 156 fluidly connected to the jettison nozzle valve 154. The jettison nozzle 156 is typically disposed near the trailing edge of the aircraft wing, with the jettison system 150 being manually activated in order to bring the aircraft below its maximum safe landing weight in the event that a flight must land soon after a heavily-laden takeoff. As shown FIG. 1A, it is known to configure both the override fuel pump 122 and the jettison fuel pump 124 to deliver fuel to a common manifold for release through the jettison system 150, so that the jettison fuel pump 124 and the override fuel pump 122 may be used to jettison fuel at roughly twice the rate at which fuel would be jettisoned by the jettison fuel pump 124 alone. However, the applicant has determined that the combination of the jettison fuel pump 124 and the override fuel pump 122, with appropriate modifications to the aircraft's engine monitoring and fuel system control circuitry, is also capable of delivering fuel through the check valve connection to the fuel manifold 130 at an increased rate sufficient to compensate for manufacturing variability in the capabilities of the boost fuel pump 112 (and 114, if present), the backpressure of the fuel manifold 130, the suction forces generated by the aircraft engine pumps, etc., and improve upon the pump-head capacity curve of the override fuel pump 122. In such an alternate mode, jettison fuel pump 124 functions as an override fuel pump assist, lowering the risk of incomplete override by decreasing pressure losses at high fuel flow rates and, in particular, increasing fuel pressure proximate the boost fuel pumps.

Figure 2:
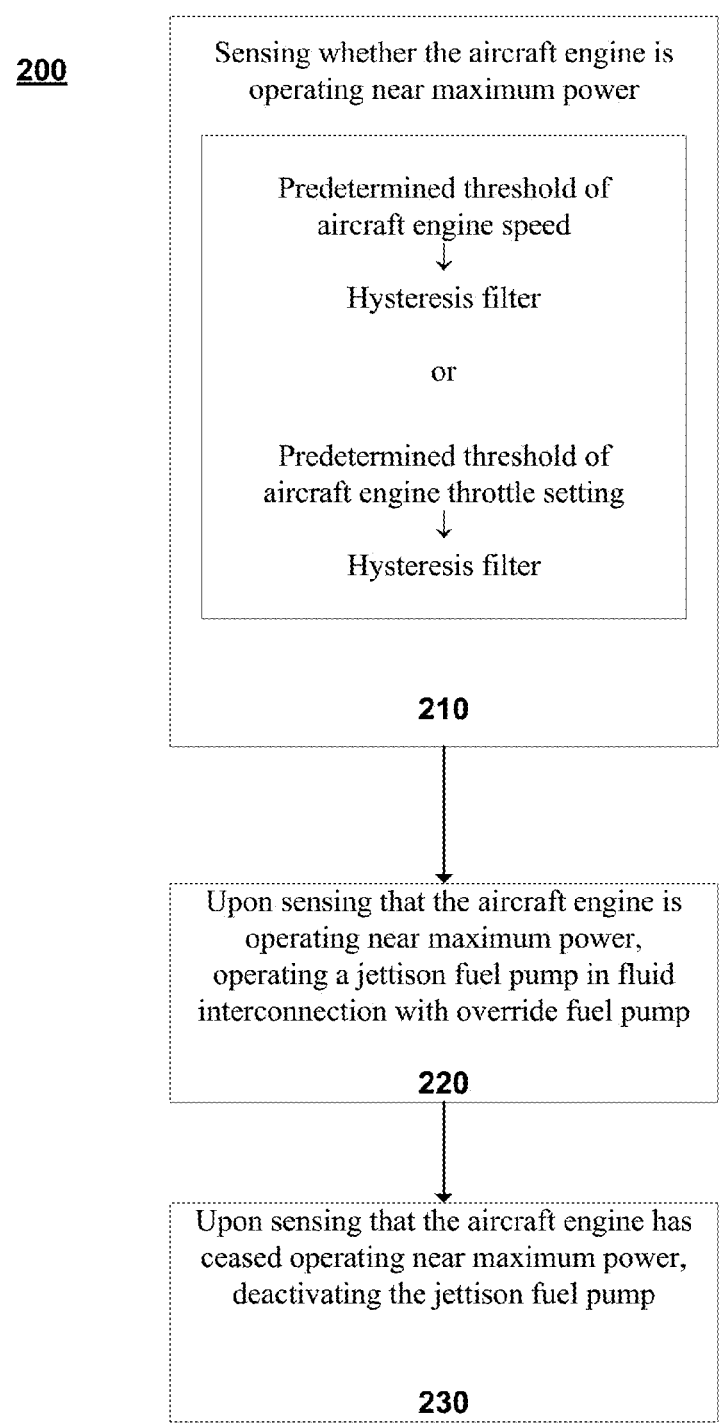
FIG. 2 is a block diagram of an aspect of the disclosed method.

Referring now to FIG. 2, in a method of supplementing fuel feed pressure and flow relating to the first aspect, the aircraft fuel system 100 is operated according to the following steps:

First, 210, sensing whether the aircraft engine is operating near maximum power. For the purposes of this application, the phrase "near maximum power" should be interpreted to mean 70% percent or more of maximum rated power. In a first variation of step 210, the sensing step senses whether the aircraft engine speed is above a predetermined threshold. In first example of this first variation, the predetermined threshold is a rotor speed of an N2 or "intermediate pressure compressor" rotor of the aircraft engine. In a first specific example of this first variation, the predetermined threshold is about 83% of the maximum rated rotor speed of the N2 rotor of the aircraft engine. In a second example of this first variation, the predetermined threshold may include a hysteresis filter having a first rotor speed of an N2 rotor for generally increasing rotor speeds and a second rotor speed of the N2 rotor for generally decreasing rotor speeds, where the first rotor speed is greater than the second rotor speed. In a second specific example of this first variation, the first rotor speed is about 83% of the maximum rated rotor speed of the N2 rotor of the aircraft engine and the second rotor speed is about 72% of the maximum rated rotor speed of the N2 rotor of the aircraft engine. In a second variation of step 210, the sensing step senses whether the aircraft engine throttle setting is above a predetermined threshold. A similar simple value threshold or a similar threshold including a hysteresis filter may be implemented as examples of this second variation. A similar threshold of about 83% of maximum throttle of the aircraft engine or a similar hysteresis filter of 83% (increasing)/72% (decreasing) of maximum throttle of the aircraft engine may be implemented as specific examples of this second variation.

Figures 1, 3A:
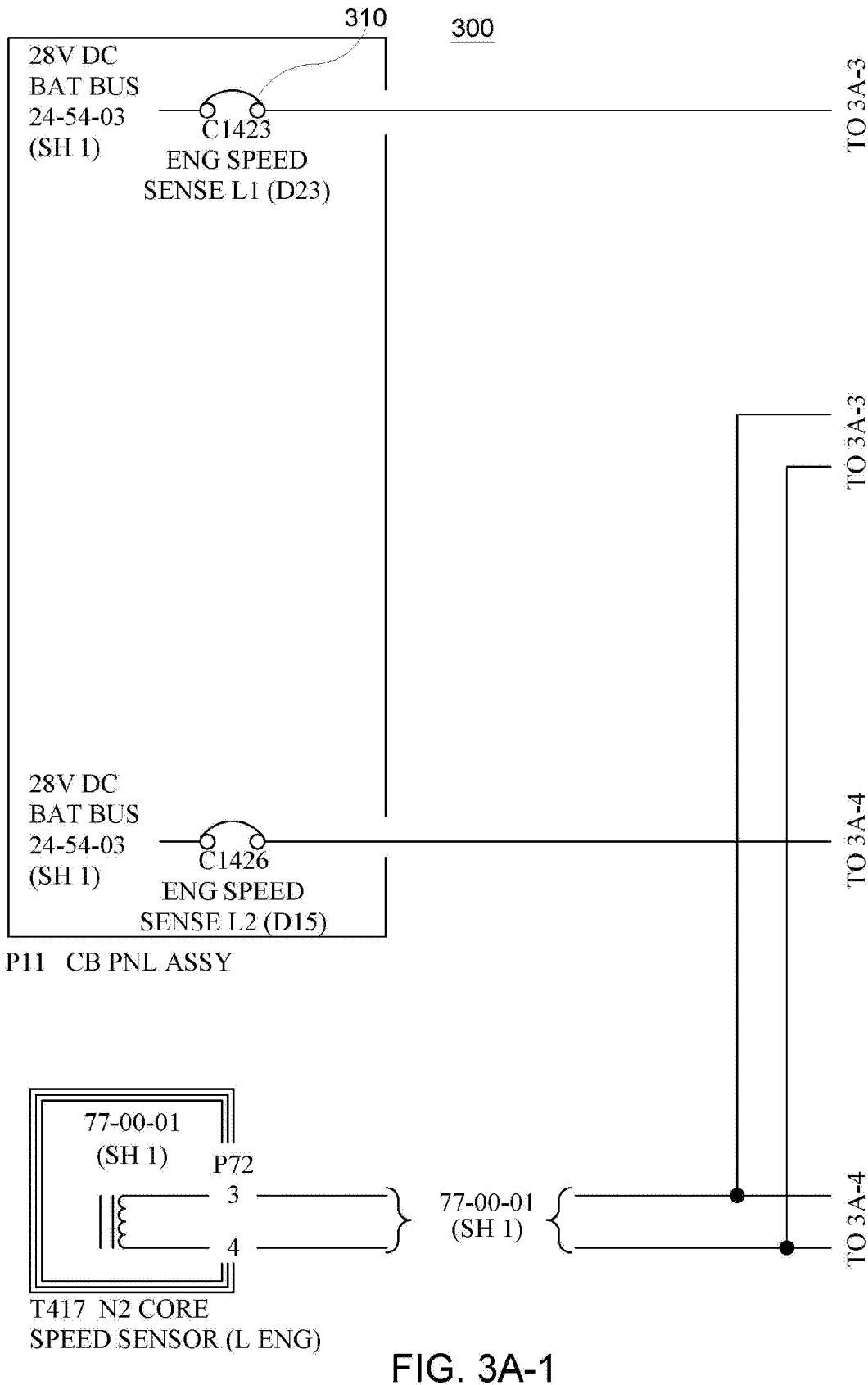
FIGS. 3A and 3A-1 to 3A-6 are a partial schematic diagram of an exemplary aircraft engine monitoring circuit, also commonly known as an "engine speed card.
Figures 2, 3A:
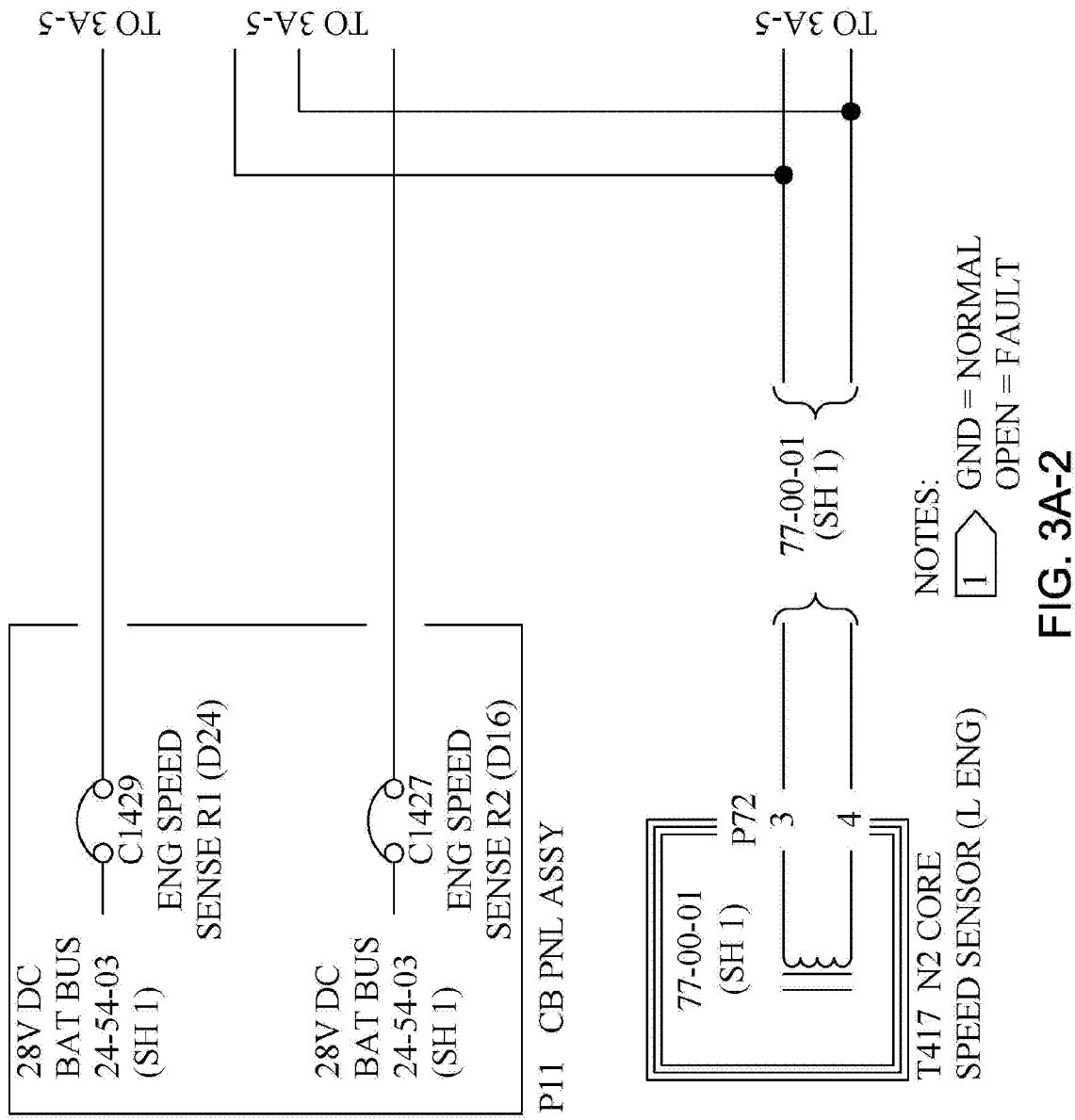
Figures 3, 3A:
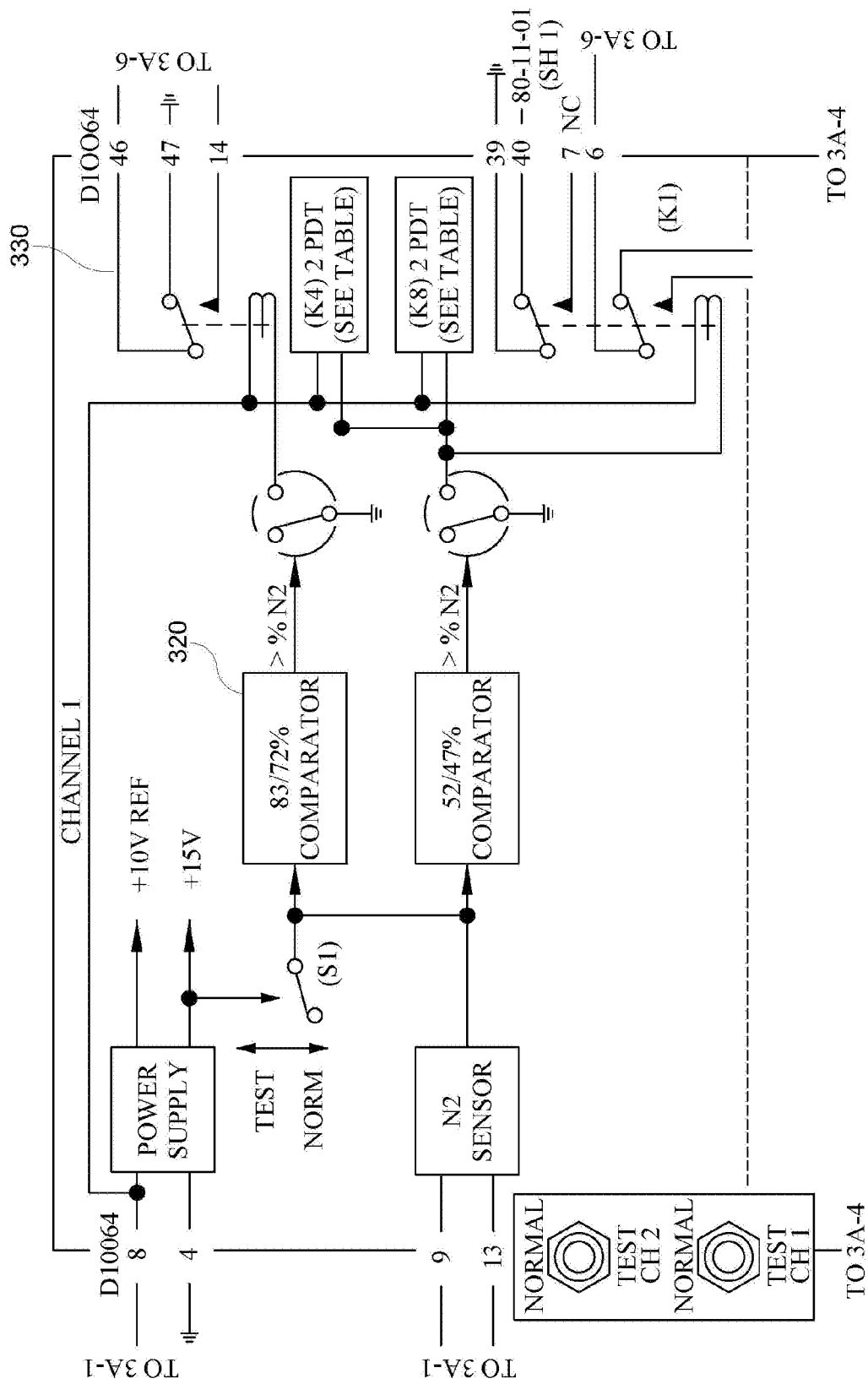
Figures 3, 3A, 4:
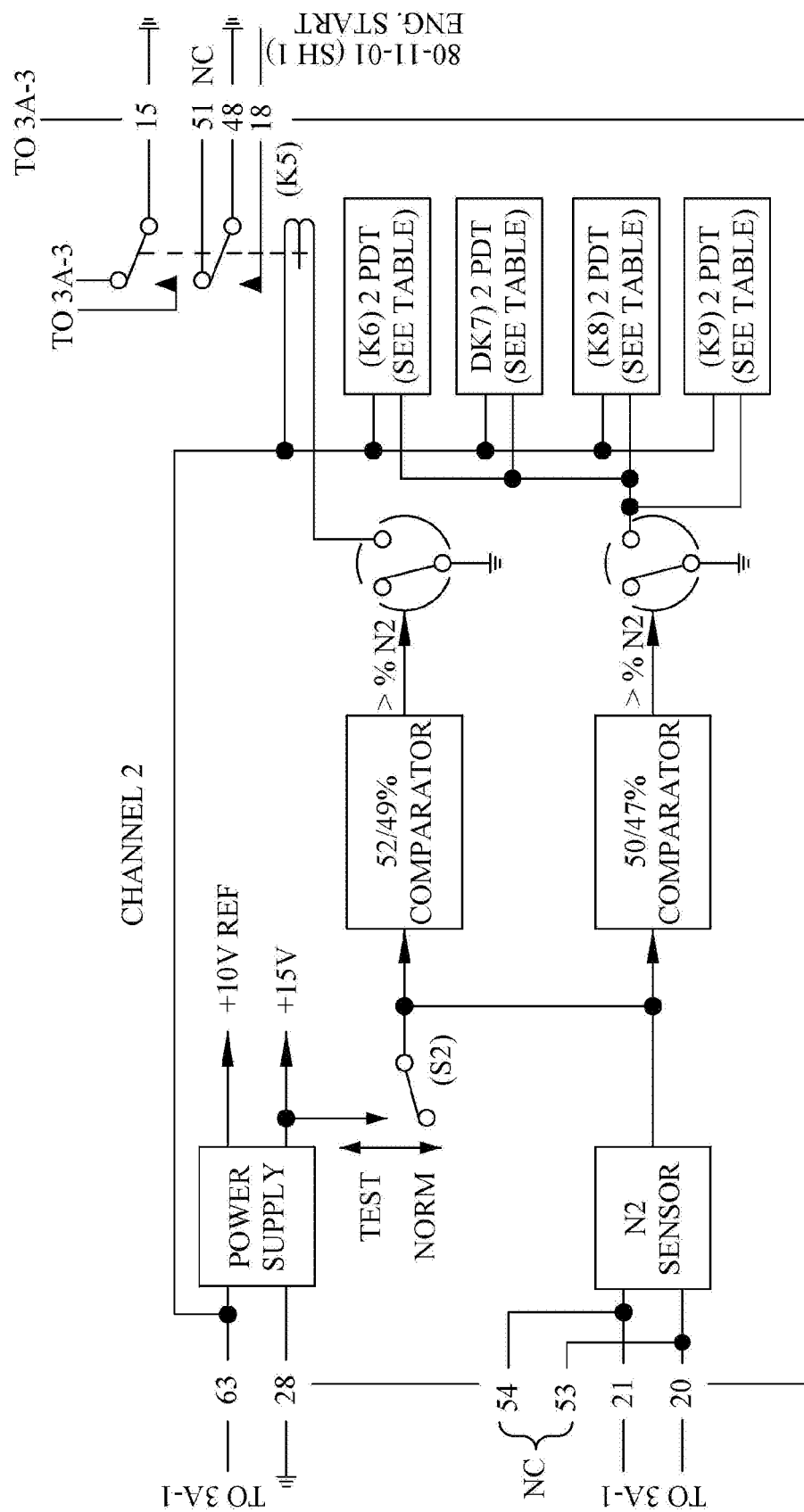
Figures 3, 3A, 4, 5:
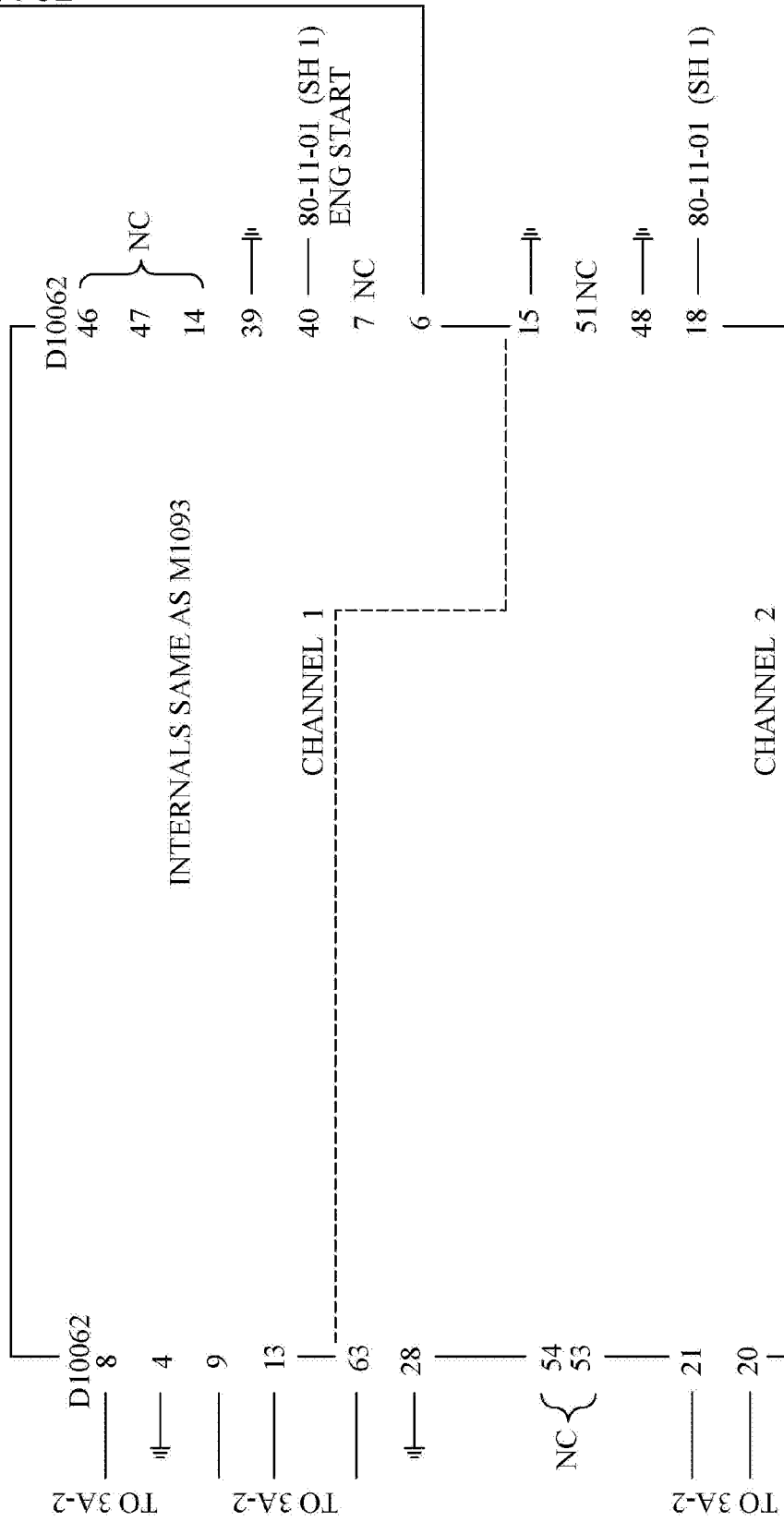
Figures 3, 3A, 4, 5, 6:
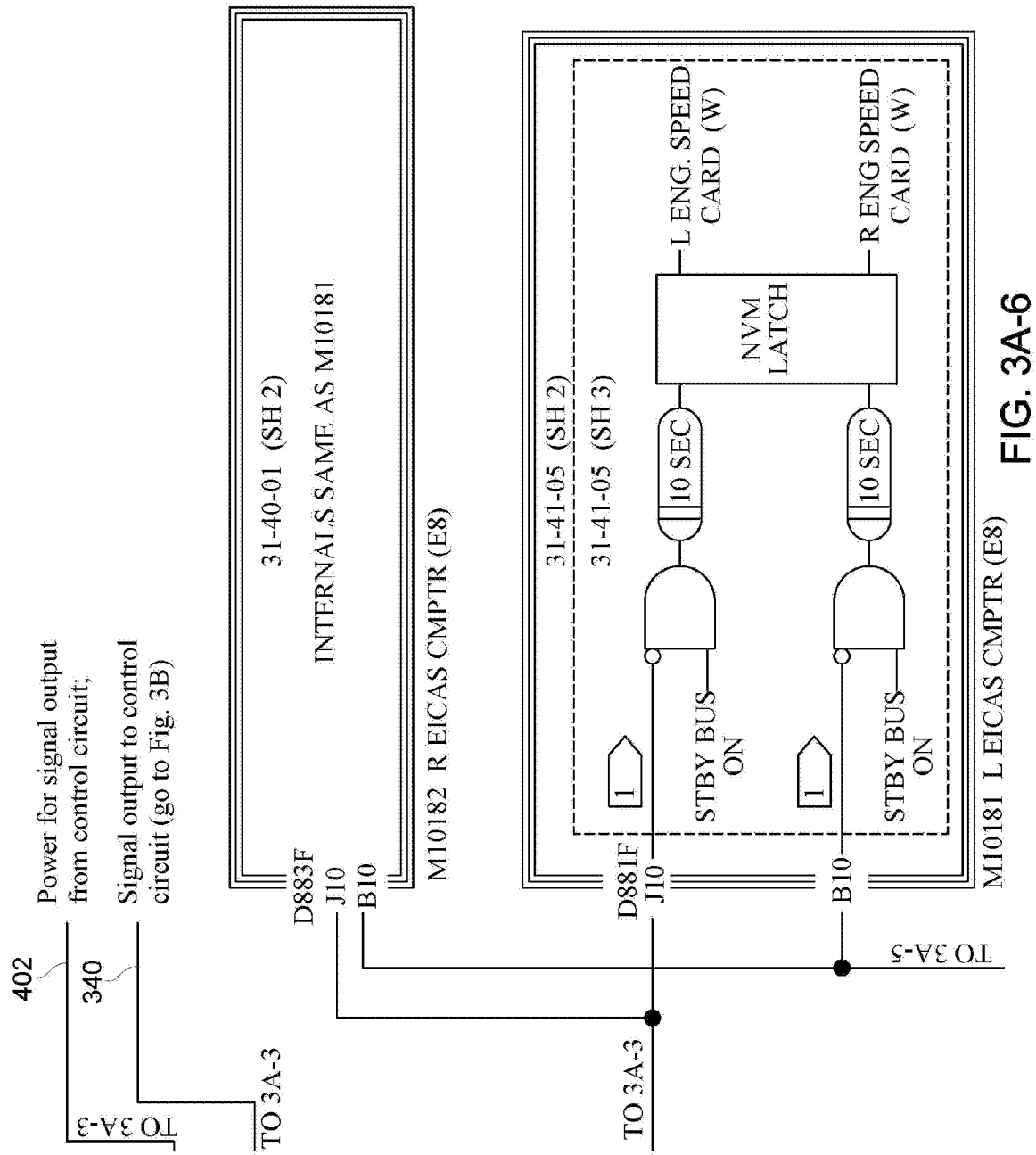
Figure 3B:
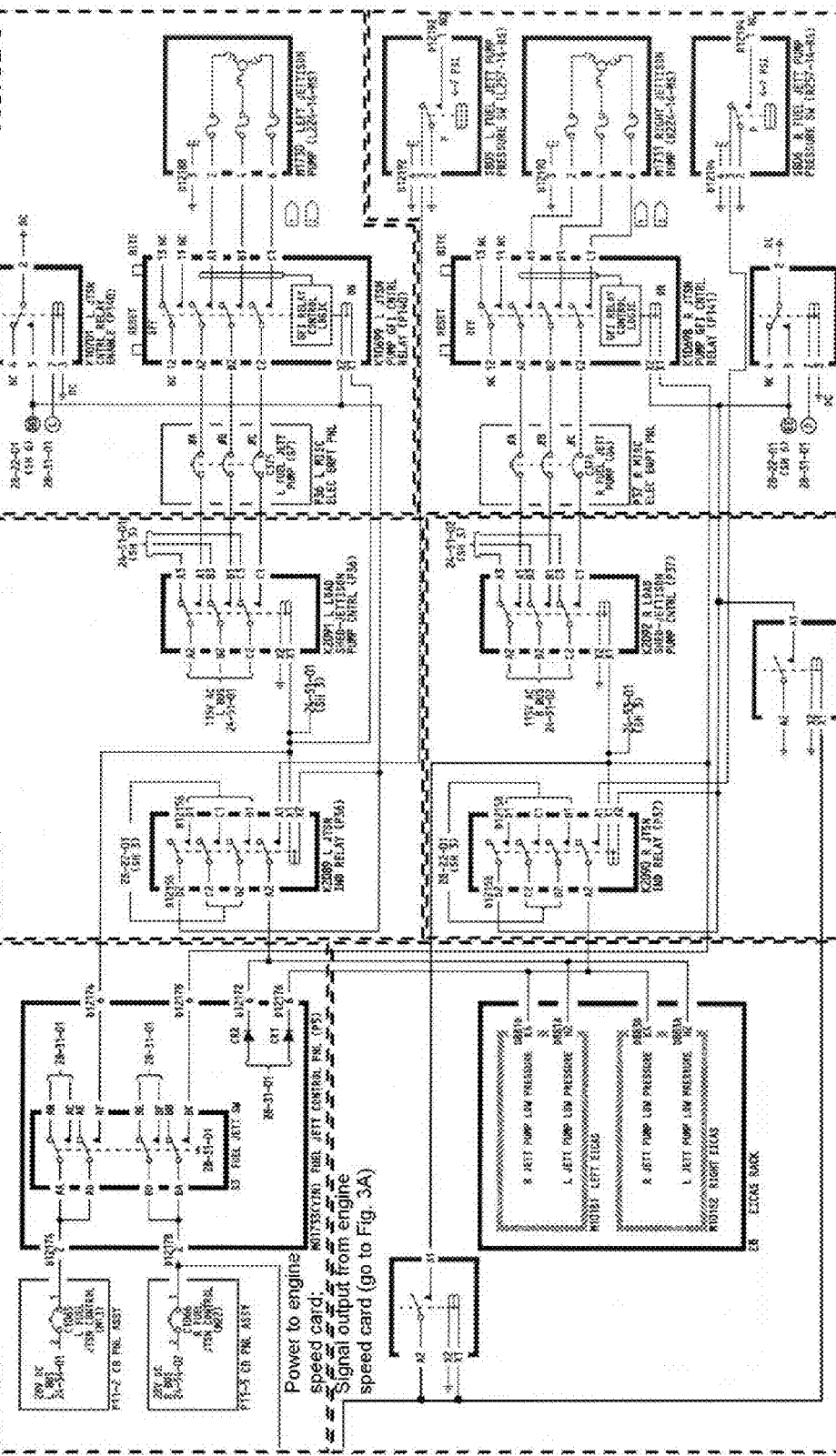
Figures 1, 3B:
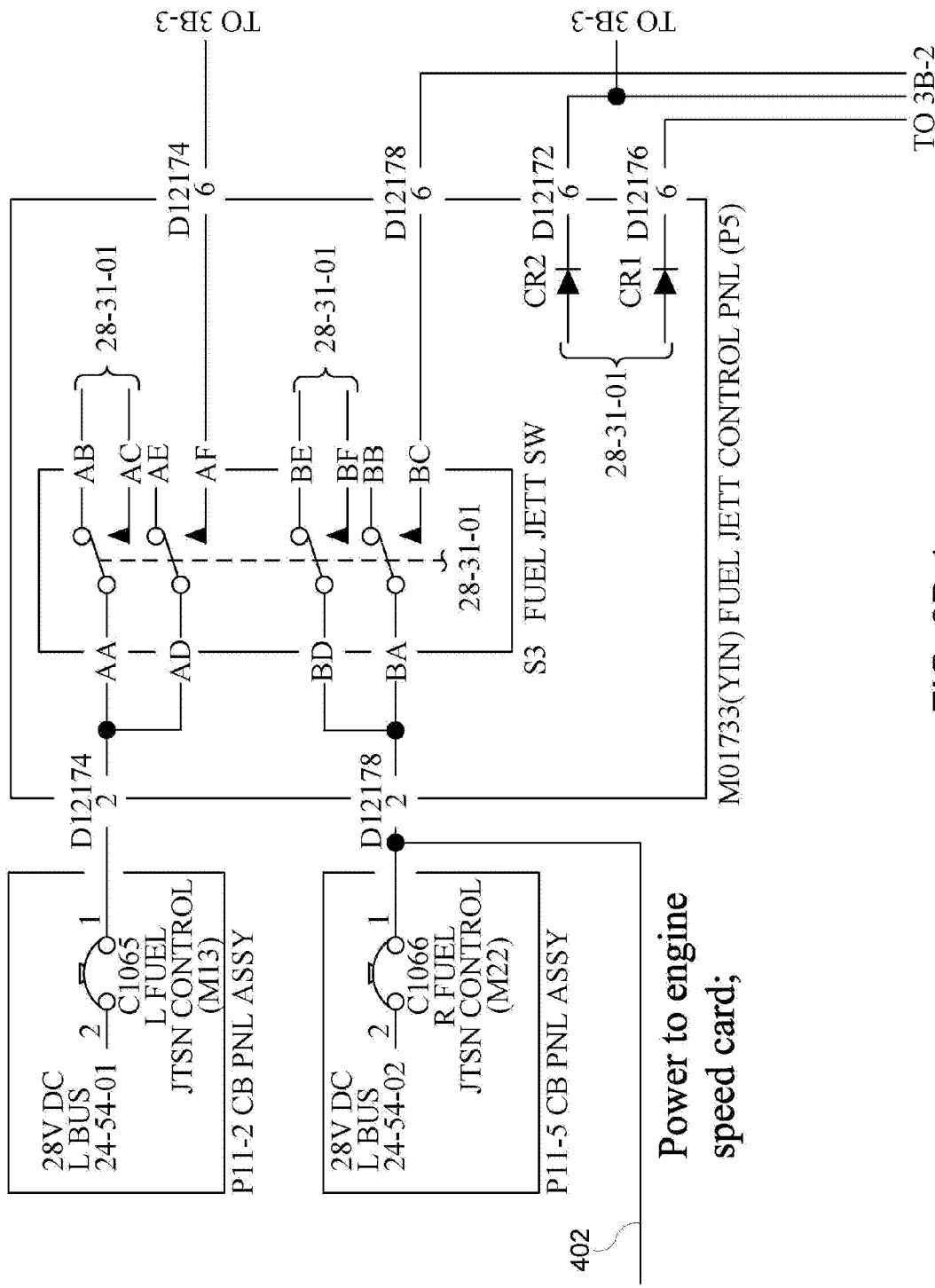
Figures 2, 3B:
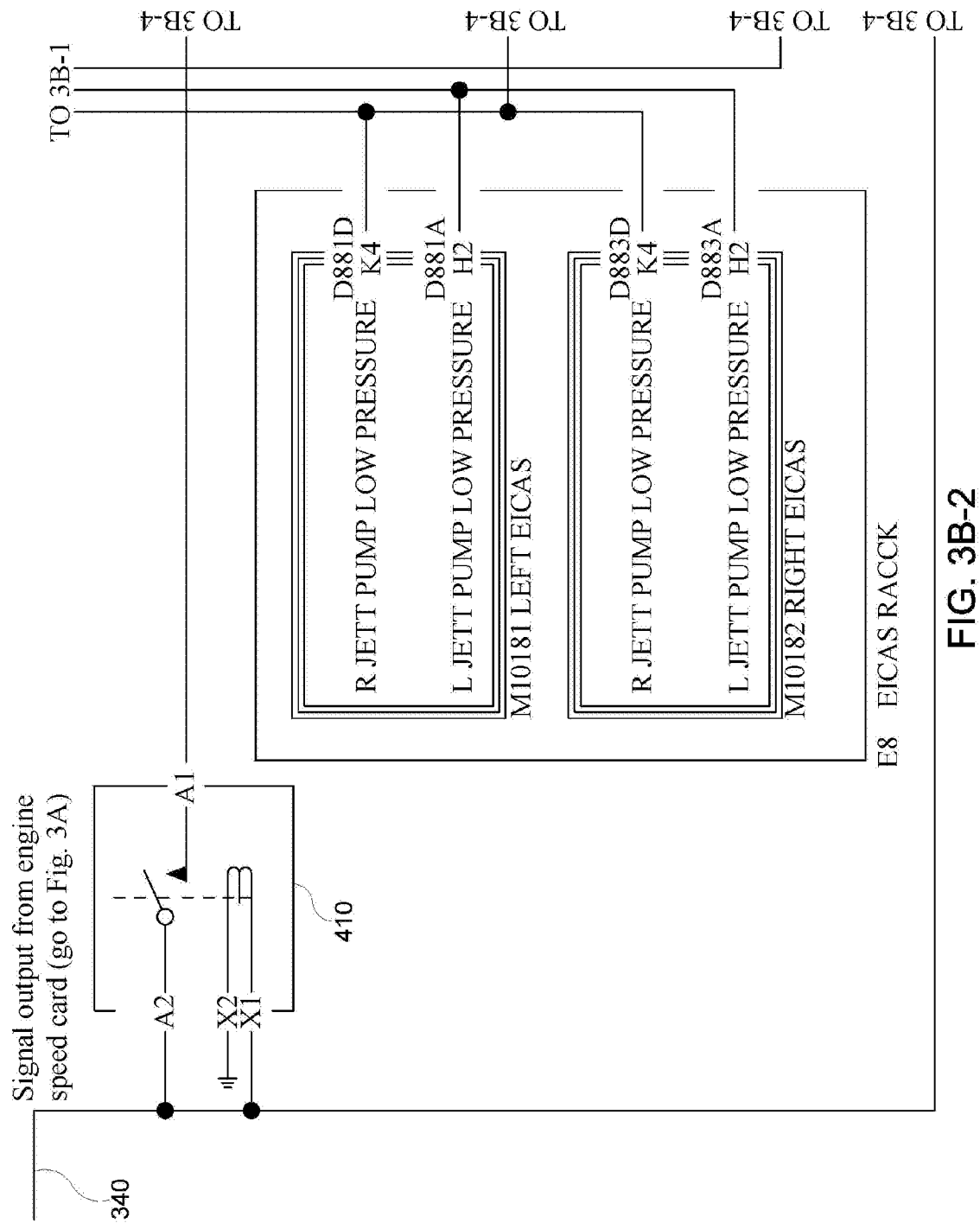
Figures 3, 3B:
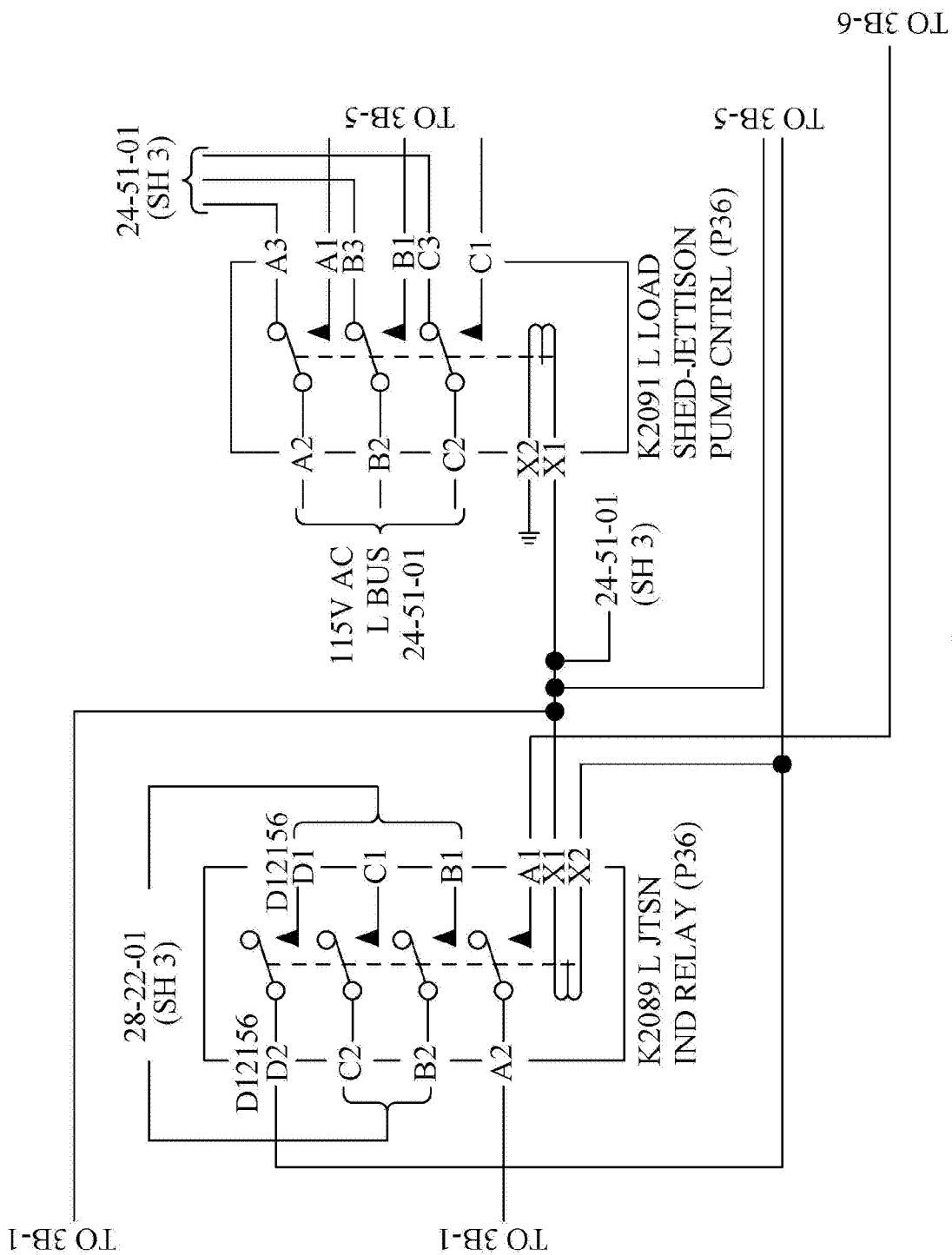
Figures 3, 3B, 4:
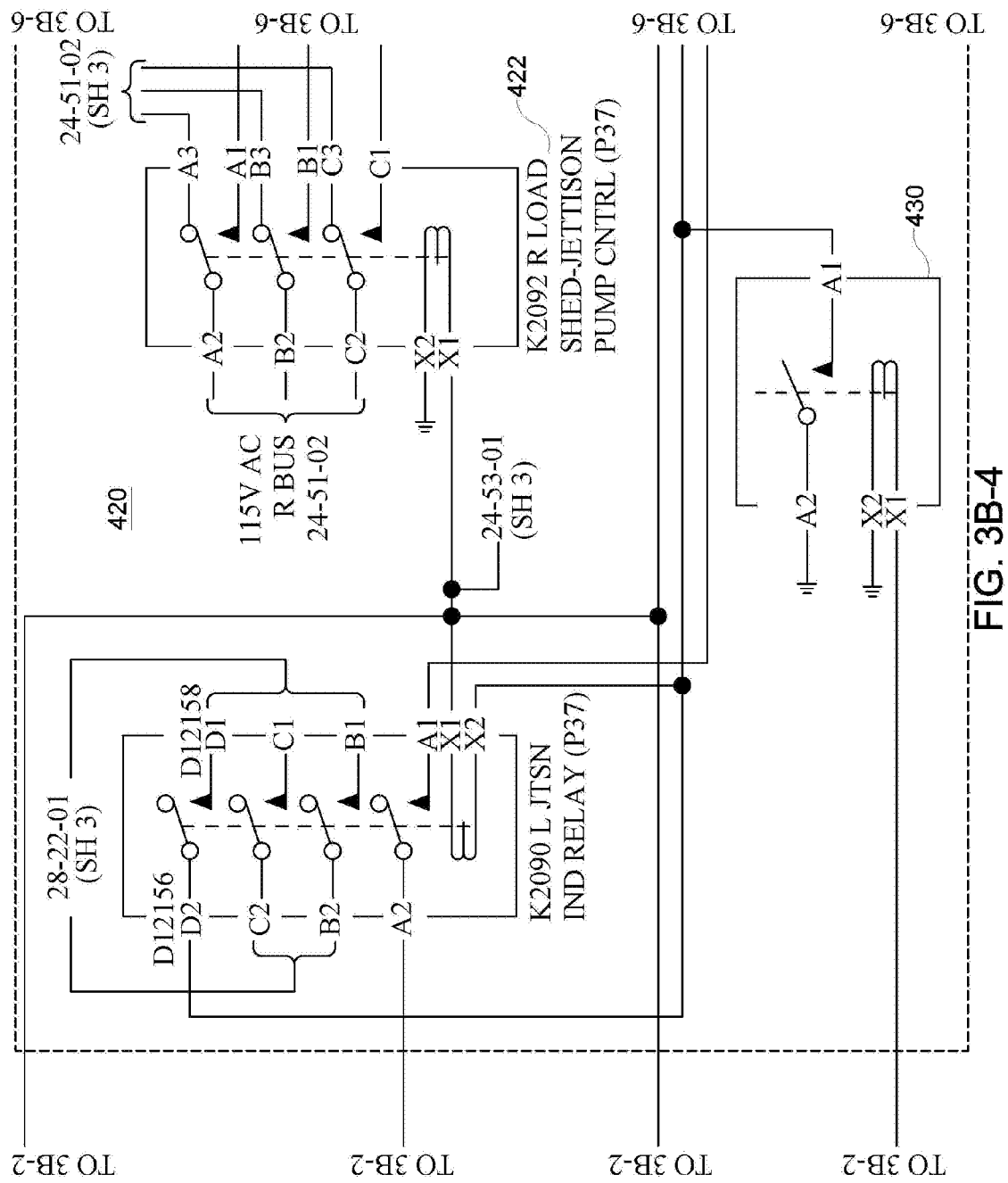
Figures 3, 3B, 4, 5, 6:
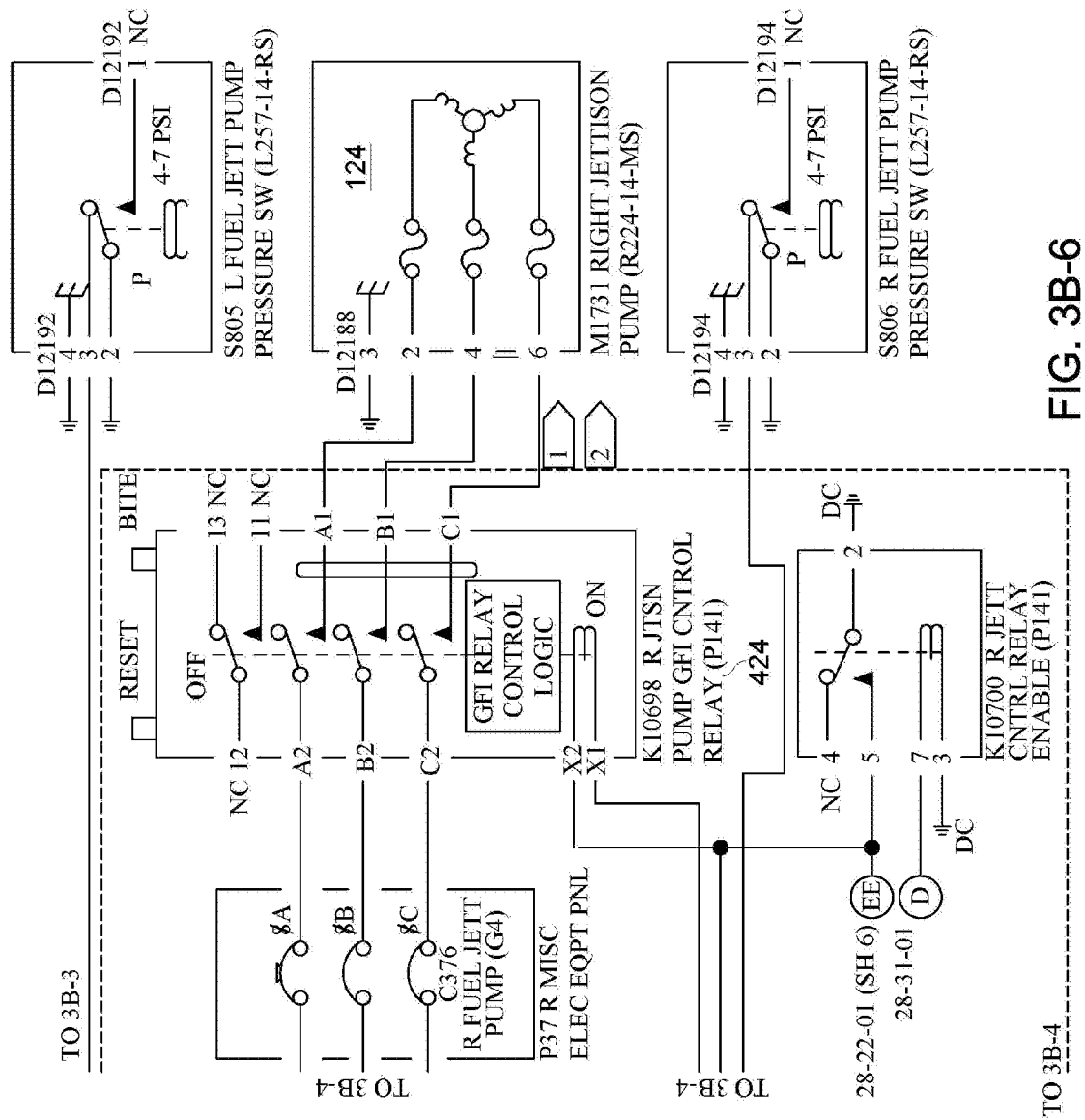

The sensing step 210 may be automated using an engine monitoring circuit 300 such as an "engine speed card." For example, FIG. 3A shows a schematic diagram of an exemplary engine monitoring circuit 300 from a Boeing 767 series aircraft. An engine speed sensor 310 detects the rotor speed of an N2 rotor in the aircraft engine. The engine speed sensor 310 is operatively connected to a comparator 320 having a hysteresis filter which triggers at 83% of the maximum rated rotor speed of the N2 rotor of the aircraft engine for generally increasing speeds, and untriggers at 72% of the maximum rated rotor speed of the N2 rotor of the aircraft engine for generally decreasing speeds. The comparator drives a control relay 330, which provides an on/off signal output 340 to a fuel system control circuit 400 as further described below. In one particular implementation, the control relay 330 obtains signal power from the jettison system control circuitry and, more specifically, from a power supply lead within the jettison system control panel 402 (as shown in FIG. 3B). Those of skill in the art will of course recognize that signal power may be obtained from a variety of sources within the aircraft.

Returning to FIG. 2, second, 220, upon sensing that the aircraft engine is operating near maximum power, operating a jettison fuel pump 124 in fluid interconnection with the override fuel pump 122 to fuel the aircraft engine. In the aforementioned first variation, the condition is of course based upon whether the aircraft engine speed is above the predetermined threshold, while in the aforementioned second variation, the condition is based upon whether the aircraft engine throttle setting is above the predetermined threshold. In general, the operating step 230 omits any jettisoning operation of the jettison transfer valve 152 and the jettison nozzle valve 154 so that operation of the jettison fuel pump 124 delivers fuel to the fuel manifold 130. However, in variations of the second step as applied to other aircraft, the operating step may require the opening of one or more other transfer valves to place the jettison fuel pump 124 in fluid communication with the override fuel pump 122, either directly or indirectly through the fuel manifold 130, .e.g., through the cross-feed manifold portion 140, in order to configure the fuel system for override assist.

The operating step 220 may be automated using a fuel system control circuit 400 which otherwise operates the jettison system 150. For example, FIG. 3B shows a schematic diagram of an exemplary jettison fuel pump control circuit 400 from a Boeing 767 series aircraft. The signal output 340 from control relay 330 (shown FIG. 3A) operates a first operating relay 410 operatively connected to a jettison fuel pump enable circuit portion 420, which operatively controls the jettison fuel pump 124 (shown as a functional block for reference purposes). In one particular implementation, the first operating relay 410 is operatively connected to an input of an electrical load shedding portion 422 of the jettison fuel pump enable circuit portion 420 and to an input of a GFI portion 424 of the jettison fuel pump enable circuit portion 420, with the latter operatively controlling the jettison fuel pump 124. The first operating relay 410 passes the signal output 340 to the inputs of the portions 422 and 424 when operated by the signal output 340. Those of skill in the art will of course recognize that the first operating relay 410 and the jettison fuel pump enable circuit portion 420 may be configured in various manners, so long as the combined first operating relay 410 and jettison fuel pump enable circuit portion 420 operatively controls the jettison fuel pump 124. The signal output 340 from control relay 330 may also operate a second operating relay 430 operatively connected to the jettison fuel pump enable circuit portion 420. In the aforementioned particular implementation, the second operating relay 430 is operatively connected to the input of the GFI interrupter portion 424 of the jettison fuel pump enable circuit portion 420, providing a path to ground for the signal output 340 passed to this input, but only when the second operating relay 430 is operated by the signal output 340.

Returning to FIG. 2, third, 230, upon sensing that the aircraft engine has ceased operating near maximum power, deactivating the jettison fuel pump 124. Again, in the aforementioned first variation, the condition is based upon whether the aircraft engine speed drops below the predetermined threshold, while in the aforementioned second variation, the condition is based upon whether the aircraft engine throttle setting drops below the predetermined threshold. In a corresponding first specific example of the first variation, where the predetermined threshold is about 83% of the maximum rated rotor speed of the N2 rotor of the aircraft engine, the deactivation step occurs after the engine speed drops below the 83% threshold. In a modification of a corresponding first variation and/or the corresponding first specific example, the deactivation step may be delayed by a predetermined period of time after sensing that the aircraft engine speed has dropped below the first predetermined threshold. Such a predetermined period of time may be used in place of a hysteresis filter to prevent transitory changes in aircraft engine speed from causing the deactivation of the jettison fuel pump 124.

In a corresponding second example of the first variation, where the first predetermined threshold includes a hysteresis filter having a first rotor speed of an N2 rotor for generally increasing rotor speeds and a second rotor speed of the N2 rotor for generally decreasing rotor speeds, the deactivating step occurs after the aircraft engine speed drops below the second rotor speed of the hysteresis filter. In a corresponding second specific example of the first variation, where the first rotor speed is about 83% of the maximum rated rotor speed of the N2 rotor of the aircraft engine and the second rotor speed is about 72% of the maximum rated rotor speed of the N2 rotor of the aircraft engine, the deactivating step occurs after the aircraft engine speed has dropped below the 72% level of the hysteresis filter. In corresponding examples and specific examples of the second variation, the deactivating step occurs after the aircraft engine throttle setting drops below the predetermined threshold (in the corresponding specific example, below about 83% of maximum throttle of the aircraft engine) or the lower level of the hysteresis filter of the predetermined threshold (in the corresponding specific example, below the about 72% level of the hysteresis filter), as the case may be. In a modification of the second variation, the deactivation step may again be delayed by a predetermined period of time after sensing that the aircraft engine throttle setting has dropped below the first predetermined threshold in place of the use of a hysteresis filter.

Again, in general, the deactivating step 230 omits any operation of the jettison transfer valve 152 and the jettison nozzle valve 154; however, in variations of the third step as applied to other aircraft, the deactivating step may require the closing of one or more transfer valves to remove the jettison fuel pump 124 from fluid interconnection with the override fuel pump 122 and/or the fuel manifold 130 in order to return to a standby configuration or to reconfigure the jettison system 150 for potential fuel jettisoning.

The deactivating step 230 may be automated using the engine monitoring circuit 300 and fuel system control circuit 400 previously described in the context of the sensing step 210 and the operating step 220. The engine speed sensor 310 is operatively connected to the comparator 320 and, in the exemplary circuit illustrated in FIG. 3A, a hysteresis filter which untriggers at about 72% of the maximum rated rotor speed of the N2 rotor of the aircraft engine for generally decreasing speeds. The comparator drives the control relay 330 to switch off the signal output 340 to the fuel system control circuit 400. This deactivates the first operating relay 410 and jettison fuel pump enable circuit portion 420. In the particular implementation previously described, the first operating relay 410 deactivates both the electrical load shedding portion 422 of the jettison fuel pump enable circuit portion 420 and the GFI interrupter portion 424 of the jettison fuel pump enable circuit portion 420, with the latter causing the deactivation of the jettison fuel pump 124. In that particular implementation, the switching off of the signal output 340 also deactivates the second operating relay 430, which disconnects the GFI interrupter portion 424 of the jettison fuel pump enable circuit portion 420 from ground.

In a second aspect of the disclosed system and method, the aircraft fuel system 100 may lack a pre-existing jettison system 150. Such configurations may exist where jettison systems are a customer option, and include many twin-engine "regional jets" capable of meeting FAA Landing Climb and Approach Climb regulations in lower capacity configurations. The second main tank 120 will include a override fuel pump 122 and, in a second embodiment, design provision for an optional jettison fuel pump 124. The aircraft fuel system control circuit may also, in the second embodiment, include pre-existing jettison system valve control circuitry 400 or design provision for optional jettison system valve control circuitry 400 through a daughterboard, external signal and power bus, or the like. Alternately, the aircraft fuel system control circuit may be upgradable to an optional aircraft fuel system control circuit including a partially or fully populated jettison control circuit.

The aircraft fuel system 100 may subsequently be retrofitted to partially install a jettison system 150 including at least a jettison fuel pump 124 in fluid communication with the override fuel pump 122. In aircraft such as the Boeing 767-300, where the override fuel pump 122 and jettison fuel pump 124 are designed to discharge into a common manifold, the jettison transfer valve 152, jettison nozzle valve 154, and jettison nozzle 156 may be omitted, along with other portions of the jettison system which are unique to that system such as jettisoning extensions to the aircraft refueling manifold 160 (which serves to distribute fuel to the main tanks during ground refueling operations as well as to deliver fuel to the jettison nozzle valve 154 and jettison nozzle 156 during jettisoning operations). Thus, the optional jettison fuel pump 124 would be fluidly connected to the fuel manifold 130 but not fluidly connected to the aircraft refueling manifold 160, serving only as an override fuel pump assist. Those of skill in the art will of course recognize that the equipment which can be omitted from a retrofit installation of the override fuel pump assist will vary depending upon the design of the jettison system 150 in each particular type of aircraft, and that additional manifold structure such as a fuel manifold extension and check valve may be required to connect the optional jettison fuel pump 124 to the fuel manifold 130 depending upon the configuration of the optional jettison system in that type of aircraft.

The fuel system control circuit 400 is also subsequently retrofitted to add at least the first operating relay 410 as described above. In a variation, the retrofitted fuel system control circuit 400 also includes the jettison fuel pump enable circuit portion 420 and second operating relay 430 described above. This may require a modification of pre-existing jettison system valve control circuitry or a modification of a pre-designed jettison system valve control circuit provided as daughterboard or bus-connected accessory board, etc. Alternately, the fuel system control circuit 400 may be upgraded to a circuit including an at least partially populated jettison control circuit that includes at least the jettison fuel pump enable circuit portion 420 and the first operating relay 410.

The retrofitted aircraft may subsequently be operated in accordance with the method described in the context of the first aspect. Automation of the method is substantially the same as that described in the context of the first aspect, although particulars such as the omission of any operation of a jettison transfer valve and jettison nozzle valve may be superfluous due to the potential absence of these structures in a retrofitted installation.

The various aspects, embodiments, implementations, and variations described above are intended to be illustrative in nature, and are not intended to limit the scope of the invention. In particular, the disclosed specific examples and figures, illustrating the systems used in a twin engine Boeing 767 aircraft, are intended to demonstrate a broader applicability to single or multiple engine jet aircraft in general. Any limitations to the invention will appear in the claims as allowed in view of the terms explicitly defined herein.

What is claimed is:

1. An override-based aircraft fuel system for fueling an aircraft engine, the aircraft fuel system comprising:
   a fuel manifold;
   a primary fuel tank including a first boost fuel pump fluidly connected to the fuel manifold;
   an auxiliary fuel tank including an override fuel pump fluidly connected to the fuel manifold and a jettison fuel pump fluidly connectable to the fuel manifold;
   an engine monitoring circuit including (a) an aircraft engine speed sensor operatively connected to a comparator and (b) a control relay selectively providing a signal output, wherein the comparator is configured to drive the control relay to provide the signal output when the aircraft engine speed sensor detects an aircraft engine speed greater than a predetermined threshold; and
   a fuel system control circuit including a first operating relay operatively connected to a jettison fuel pump enable circuit portion, wherein the signal output operates the first operating relay and the jettison fuel pump enable circuit portion, and wherein the jettison fuel pump enable circuit portion operatively controls the jettison fuel pump to deliver fuel to the fuel manifold.

2. The override-based aircraft fuel system of claim 1, further comprising a jettison transfer valve fluidly connected to the jettison fuel pump, wherein the fuel system control circuit is configured to operate the jettison fuel pump enable circuit portion and jettison fuel pump without operating the jettison transfer valve so as to permit the jettisoning of fuel.

3. The override-based aircraft fuel system of claim 1, wherein the engine speed sensor senses a rotor speed of an N2 rotor of the aircraft engine.

4. The override-based aircraft fuel system of claim 3, wherein the predetermined threshold of the comparator includes a hysteresis filter having a first rotor speed of an N2 rotor for generally increasing rotor speeds and a second rotor speed of the N2 rotor for generally decreasing rotor speeds, where the first rotor speed is greater than the second rotor speed.

5. The override-based aircraft fuel system of claim 4, wherein the first rotor speed is about 83% of a maximum rated rotor speed of the N2 rotor of the aircraft engine and the second rotor speed is about 72% of the maximum rated rotor speed of the N2 rotor of the aircraft engine.

6. The override-based aircraft fuel system of claim 1, wherein the fuel system control circuit includes a second operating relay operatively connected to the jettison fuel pump enable circuit portion, and wherein the signal output operates the second operating relay to provide a path to ground for the signal output operating the jettison fuel pump enable circuit portion.

7. The override-based aircraft fuel system of claim 3, wherein the comparator is configured to delay deactivation of the control relay by a predetermined period of time after sensing that the rotor speed of the N2 rotor has dropped below the predetermined threshold.

8. The override-based aircraft fuel system of claim 1, wherein the engine speed sensor senses an aircraft engine throttle setting of the aircraft engine.

9. The override-based aircraft fuel system of claim 8, wherein the predetermined threshold of the comparator includes a hysteresis filter having a first aircraft engine throttle setting for generally increasing throttle settings and a second aircraft engine throttle setting for generally decreasing throttle settings, where the first aircraft engine throttle setting is greater than the second aircraft engine throttle setting.

10. The override-based aircraft fuel system of claim 9, wherein the first aircraft engine throttle setting is about 83% of a maximum throttle of the aircraft engine and the second aircraft engine throttle setting is about 72% of the maximum throttle of the aircraft engine.

11. The override-based aircraft fuel system of claim 8, wherein the comparator is configured to delay deactivation of the control relay by a predetermined period of time after sensing that the aircraft engine throttle setting has dropped below the predetermined threshold.

12. The override-based aircraft fuel system of claim 1, wherein the signal output additionally operates a transfer valve so as to place the jettison fuel pump in fluid communication with the override fuel pump via the outputs of the jettison and override fuel pumps.

13. The override-based aircraft fuel system of claim 1, wherein the jettison fuel pump is fluidly connected to the auxiliary fuel tank contents, and fluidly connectable to the fuel manifold, but not fluidly connected or connectable to other aircraft fuel systems.

14. A retrofit system for installation in an aircraft having a fuel manifold, at least one primary fuel tank including at least one boost fuel pump fluidly connected to the fuel manifold, at least one auxiliary fuel tank including at least one override fuel pump fluidly connected to the fuel manifold, and an engine monitoring circuit including an aircraft engine speed sensor, the retrofit system comprising:
 a fuel system control circuit having a first operating relay operatively connected to a jettison fuel pump enable circuit portion, the first operating relay being operably connectable to a control relay of the engine monitoring circuit for selective passing of a signal output of the control relay to the jettison fuel pump enable circuit portion,
 wherein the first operating relay is operably connected to an electrical load shedding portion of the jettison fuel pump enable circuit portion and to an input of a GFI portion of the jettison fuel pump enable circuit portion.

15. The retrofit system of claim 14, wherein the fuel system control circuit is configured to operate the jettison fuel pump enable circuit portion and a jettison fuel pump without operating a jettison transfer valve so as to permit the jettisoning of fuel.

16. A retrofit system for installation in an aircraft having a fuel manifold, at least one primary fuel tank including at least one boost fuel pump fluidly connected to the fuel manifold, at least one auxiliary fuel tank including at least one override fuel pump fluidly connected to the fuel manifold, and an engine monitoring circuit including an aircraft engine speed sensor, the retrofit system comprising:
 a fuel system control circuit having a first operating relay operatively connected to a jettison fuel pump enable circuit portion, the first operating relay being operably connectable to a control relay of the engine monitoring circuit for selective passing of a signal output of the control relay to the jettison fuel pump enable circuit portion,
 further comprising at least one jettison fuel pump installable within the at least one auxiliary fuel tank, said at least one jettison fuel pump being fluidly connectable to said fuel manifold and operably connectable to said jettison fuel pump enable circuit portion for selective control by said control relay.

17. A retrofit system for installation in an aircraft having a fuel manifold, at least one primary fuel tank including at least one boost fuel pump fluidly connected to the fuel manifold, at least one auxiliary fuel tank including at least one override fuel pump fluidly connected to the fuel manifold, and an engine monitoring circuit including an aircraft engine speed sensor, the retrofit system comprising:
 a fuel system control circuit having a first operating relay operatively connected to a jettison fuel pump enable circuit portion, the first operating relay being operably connectable to a control relay of the engine monitoring circuit for selective passing of a signal output of the control relay to the jettison fuel pump enable circuit portion,
 further comprising: an engine monitoring circuit portion including (a) a comparator operatively connectable to the aircraft engine speed sensor and (b) the control relay selectively providing the signal output, wherein the comparator is configured to drive the control relay to provide the signal output when the aircraft engine speed sensor detects an aircraft engine speed greater than a predetermined threshold.

18. The retrofit system of claim 17, wherein the comparator includes a hysteresis filter having a first threshold generally increasing engine speeds indicated by the engine speed sensor and a second threshold for generally decreasing engine speeds indicated by the engine speed sensor, where the first threshold is greater than the second threshold.

19. The retrofit system of claim 18, wherein the comparator is configured to delay deactivation of the control relay by a predetermined period of time after sensing that the engine speed indicated by the engine speed sensor has dropped below the predetermined threshold.

* * * * *